(12) United States Patent
Kemper et al.

(10) Patent No.: US 8,699,770 B2
(45) Date of Patent: *Apr. 15, 2014

(54) IDENTIFICATION OF REGIONS OF INTEREST AND EXTRACTION OF TIME VALUE CURVES IN IMAGING PROCEDURES

(71) Applicant: Medrad, Inc., Indianola, PA (US)

(72) Inventors: Corey A. Kemper, Pittsburgh, PA (US); John F. Kalafut, Pittsburgh, PA (US)

(73) Assignee: Bayer Medical Care Inc., Indianola, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,525

(22) Filed: Oct. 19, 2012

(65) Prior Publication Data

US 2013/0044926 A1 Feb. 21, 2013

Related U.S. Application Data

(62) Division of application No. 12/144,811, filed on Jun. 24, 2008, now Pat. No. 8,315,449.

(51) Int. Cl.
*G06K 9/46* (2006.01)
(52) U.S. Cl.
USPC .......................................... 382/128; 382/130
(58) Field of Classification Search
USPC ................................................ 382/128, 130
See application file for complete search history.

(56) References Cited

U.S. PATENT DOCUMENTS 3,701,345 A 10/1972 Heilman et al.
3,812,843 A 5/1974 Wootten et al.
(Continued)

FOREIGN PATENT DOCUMENTS

CA 2045070 A1 2/1992
EP 0619122 A1 10/1994
(Continued)

OTHER PUBLICATIONS

Cademartini, F. and Luccichenti, G., et al (2004) "Sixteen-Row Multislice Computed Tomography: Basic Concepts, Protocols, and Enhanced Clinical Application," Semir Ultrasound CT MR 25(1):2-16.

(Continued)

*Primary Examiner* — Clayton E LaBalle
*Assistant Examiner* — Leon W Rhodes, Jr.
(74) *Attorney, Agent, or Firm* — James R. Stevenson; Greg Bradley; Henry E. Bartony, Jr.

(57) ABSTRACT

A method of extracting at least one time-value curve to determine a protocol in an imaging procedure using an imaging system, includes: determining a first N-dimensional data set of pixel values of a portion of a body of the patient at a first time using the imaging system, wherein N is an integer; determining at least a second N-dimensional data set of pixel values of the portion at a second time using the imaging system; computing a predetermined number of correlated segments of the imaged portion corresponding to a predetermined number of regions of interest of the patient by computing a similarity metric of a time series of pixel values; computing the at least one time-value curve for at least one of the regions of interest; and determining a protocol for a diagnostic scan using the image system based at least in part upon data from the time value curve.

27 Claims, 6 Drawing Sheets

(56) References Cited

U.S. PATENT DOCUMENTS

| | | |
|---|---|---|
| 3,888,239 A | 6/1975 | Rubinstein |
| 3,898,983 A | 8/1975 | Elam |
| 3,941,126 A | 3/1976 | Dietrich et al. |
| 4,090,502 A | 5/1978 | Tajika |
| 4,135,247 A | 1/1979 | Gordon et al. |
| 4,151,845 A | 5/1979 | Clemens |
| 4,187,057 A | 2/1980 | Xanthopoulos |
| 4,191,183 A | 3/1980 | Mendelson |
| 4,207,871 A | 6/1980 | Jenkins |
| 4,280,494 A | 7/1981 | Cosgrove, Jr. et al. |
| 4,319,568 A | 3/1982 | Tregoning |
| 4,340,153 A | 7/1982 | Spivey |
| 4,392,849 A | 7/1983 | Petre et al. |
| 4,396,385 A | 8/1983 | Kelly et al. |
| 4,402,310 A | 9/1983 | Kimura |
| 4,409,966 A | 10/1983 | Lambrecht et al. |
| 4,444,198 A | 4/1984 | Petre |
| 4,447,230 A | 5/1984 | Gula et al. |
| 4,477,923 A | 10/1984 | Baumann et al. |
| 4,479,761 A | 10/1984 | Bilstad et al. |
| 4,512,764 A | 4/1985 | Wunsch |
| 4,544,949 A | 10/1985 | Kurihara |
| 4,551,133 A | 11/1985 | Zegers de Beyl et al. |
| 4,559,036 A | 12/1985 | Wunsch |
| 4,563,175 A | 1/1986 | LaFond |
| 4,585,009 A | 4/1986 | Barker et al. |
| 4,611,340 A | 9/1986 | Okazaki |
| 4,633,307 A | 12/1986 | Honda |
| 4,634,426 A | 1/1987 | Kamen |
| 4,636,144 A | 1/1987 | Abe et al. |
| 4,655,197 A | 4/1987 | Atkinson |
| 4,672,651 A | 6/1987 | Horiba et al. |
| 4,710,166 A | 12/1987 | Thompson et al. |
| 4,723,261 A | 2/1988 | Janssen et al. |
| 4,750,643 A | 6/1988 | Wortrich |
| 4,754,786 A | 7/1988 | Roberts |
| 4,783,273 A | 11/1988 | Knutsson et al. |
| 4,795,429 A | 1/1989 | Feldstein |
| 4,798,590 A | 1/1989 | O'Leary et al. |
| 4,838,856 A | 6/1989 | Mulreany et al. |
| 4,840,620 A | 6/1989 | Kobayashi et al. |
| 4,853,521 A | 8/1989 | Claeys et al. |
| 4,854,324 A | 8/1989 | Hirschman et al. |
| 4,857,056 A | 8/1989 | Talonn |
| 4,874,359 A | 10/1989 | White et al. |
| 4,880,014 A | 11/1989 | Zarowitz et al. |
| 4,887,554 A | 12/1989 | Whiteford |
| 4,903,705 A | 2/1990 | Imamura et al. |
| 4,913,154 A | 4/1990 | Ermert et al. |
| 4,925,444 A | 5/1990 | Orkin et al. |
| 4,943,279 A | 7/1990 | Samiotes et al. |
| 4,946,439 A | 8/1990 | Eggers |
| 4,966,579 A | 10/1990 | Polaschegg |
| 5,009,654 A | 4/1991 | Minshall et al. |
| 5,018,173 A | 5/1991 | Komai et al. |
| 5,032,112 A | 7/1991 | Fairchild et al. |
| 5,034,987 A | 7/1991 | Fujimoto et al. |
| 5,040,537 A | 8/1991 | Katakura |
| 5,078,683 A | 1/1992 | Sancoff et al. |
| 5,088,981 A | 2/1992 | Howson et al. |
| 5,104,374 A | 4/1992 | Bishko et al. |
| 5,111,492 A | 5/1992 | Klausz |
| 5,128,121 A | 7/1992 | Berg et al. |
| 5,135,000 A | 8/1992 | Akselrod et al. |
| 5,180,895 A | 1/1993 | Gibby et al. |
| 5,301,672 A | 4/1994 | Kalender |
| 5,310,997 A | 5/1994 | Roach et al. |
| 5,317,506 A | 5/1994 | Coutre et al. |
| 5,328,463 A | 7/1994 | Barton et al. |
| 5,339,799 A | 8/1994 | Kami et al. |
| 5,349,625 A | 9/1994 | Born et al. |
| 5,361,761 A | 11/1994 | Van Lysel et al. |
| 5,368,562 A | 11/1994 | Blomqquist et al. |
| 5,378,231 A | 1/1995 | Johnson et al. |
| 5,382,232 A | 1/1995 | Hague et al. |
| 5,383,858 A | 1/1995 | Reilly et al. |
| 5,385,540 A | 1/1995 | Abbott et al. |
| 5,400,792 A | 3/1995 | Hoebel et al. |
| 5,417,213 A | 5/1995 | Prince |
| 5,431,627 A | 7/1995 | Pastrone et al. |
| 5,445,621 A | 8/1995 | Poli et al. |
| 5,456,255 A | 10/1995 | Abe et al. |
| 5,458,128 A | 10/1995 | Polanyi et al. |
| 5,459,769 A | 10/1995 | Brown |
| 5,469,849 A | 11/1995 | Sasaki et al. |
| 5,472,403 A | 12/1995 | Cornacchia et al. |
| 5,474,683 A | 12/1995 | Bryant et al. |
| 5,485,831 A | 1/1996 | Holdsworth et al. |
| 5,494,036 A | 2/1996 | Ubert, III et al. |
| 5,494,822 A | 2/1996 | Sadri |
| 5,496,273 A | 3/1996 | Pastrone et al. |
| 5,507,412 A | 4/1996 | Ebert et al. |
| 5,515,851 A | 5/1996 | Goldstein |
| 5,522,798 A | 6/1996 | Johnson et al. |
| 5,531,679 A | 7/1996 | Schulman et al. |
| 5,569,181 A | 10/1996 | Woelpper et al. |
| 5,573,515 A | 11/1996 | Wilson et al. |
| 5,583,902 A | 12/1996 | Bae |
| 5,687,208 A | 11/1997 | Bae et al. |
| 5,713,358 A | 2/1998 | Mistretta et al. |
| 5,724,976 A | 3/1998 | Mine et al. |
| 5,743,266 A | 4/1998 | Levene et al. |
| 5,768,405 A | 6/1998 | Makram-Ebeid |
| 5,840,026 A | 11/1998 | Ubert et al. |
| 5,865,744 A | 2/1999 | Lemelson |
| 5,881,124 A | 3/1999 | Giger et al. |
| 6,055,985 A | 5/2000 | Bae et al. |
| 6,201,889 B1 | 3/2001 | Vannah |
| 6,236,706 B1 | 5/2001 | Hsieh |
| 6,317,623 B1 | 11/2001 | Griffiths et al. |
| 6,344,030 B1 | 2/2002 | Duchon et al. |
| 6,381,486 B1 * | 4/2002 | Mistretta et al. ............. 600/420 |
| 6,385,483 B1 | 5/2002 | Uber, III et al. |
| 6,387,098 B1 | 5/2002 | Uber, III et al. |
| 6,397,098 B1 | 5/2002 | Uber, III et al. |
| 6,470,889 B1 | 10/2002 | Bae et al. |
| 6,471,674 B1 | 10/2002 | Emig et al. |
| 6,478,735 B1 | 11/2002 | Pope et al. |
| 6,556,695 B1 | 4/2003 | Packer et al. |
| 6,626,862 B1 | 9/2003 | Duchon et al. |
| 6,635,030 B1 | 10/2003 | Bae et al. |
| 6,643,537 B1 | 11/2003 | Zatezalo et al. |
| 6,656,157 B1 | 12/2003 | Duchon et al. |
| 6,673,033 B1 | 1/2004 | Sciulli et al. |
| 6,731,971 B2 | 5/2004 | Evans, III et al. |
| 6,775,764 B1 | 8/2004 | Pinsky |
| 6,970,735 B2 | 11/2005 | Uber, III et al. |
| 7,094,216 B2 | 8/2006 | Trombley, III et al. |
| 7,326,186 B2 | 2/2008 | Trombley, III et al. |
| 7,672,711 B2 * | 3/2010 | Haras et al. ............. 600/431 |
| 7,864,997 B2 * | 1/2011 | Aben ............. 382/128 |
| 7,925,330 B2 | 4/2011 | Kalafut et al. |
| 7,996,381 B2 | 8/2011 | Uber, III et al. |
| 8,055,328 B2 | 11/2011 | Uber, III et al. |
| 8,197,437 B2 | 6/2012 | Kalafut et al. |
| 8,295,914 B2 | 10/2012 | Kalafut et al. |
| 2003/0135111 A1 | 7/2003 | Meaney et al. |
| 2003/0212364 A1 | 11/2003 | Mann et al. |
| 2003/0216683 A1 | 11/2003 | Shekalim |
| 2004/0010229 A1 | 1/2004 | Houde et al. |
| 2004/0025452 A1 | 2/2004 | McLean |
| 2004/0064040 A1 | 4/2004 | Masuda et al. |
| 2004/0097875 A1 | 5/2004 | Bae |
| 2004/0162484 A1 | 8/2004 | Nemoto |
| 2004/0215144 A1 | 10/2004 | Duchon et al. |
| 2007/0016016 A1 * | 1/2007 | Haras et al. ............. 600/431 |

FOREIGN PATENT DOCUMENTS

| | | |
|---|---|---|
| JP | 60194934 A | 10/1985 |
| WO | 8500292 A1 | 1/1985 |
| WO | 8803815 A1 | 6/1988 |

(56) References Cited

FOREIGN PATENT DOCUMENTS

| WO | 9415664 A1 | 7/1994 |
|---|---|---|
| WO | 9820919 A1 | 5/1998 |
| WO | 0061216 A1 | 10/2000 |

OTHER PUBLICATIONS

K.T. Bae, J.P. Heiken and J.A. Brink, "Aortic and Hepatic Contrast Medium Enhancement at CT Part I. Prediction and a Computer Model." Radiology, vol. 207, pp. 647-655, 1998.

K.T. Bae, "Peak Contrast Enhancement in CR and MR Angiography: When Does It Occur and Why? Pharmacokinetic Study in a Porcine Model", Radiology. vol. 227, pp. 809-816, 2003.

K.T. Bae et al., "Multiphasic Injection Method for Uniform Prolonged Vascular Enhancement at CT Angiography: Pharmacokinetic Analysis and Experimental Porcine Method," Radiology, vol. 216, pp. 872-880, 2000.

D. Fleischmann and K. Hittmair, "Mathematical Analysis of Arterial Enhancement and Optimization of Bolus Geometry for CT Angiography Using the Discrete Fourier Transform", J Comput Assist Tomogr, vol. 23, pp. 474-484, 1999.

Fisher and Teo, "Optimal Insulin Infusion Resulting from a Mathematical Model of Blood Glucoose Dynamics," IEEE Trans Biomed Eng. vol. 36(4). pp. 479-486, 1989.

Jacobs, "Algorithm for Optimal Linear Model-Based Control with Application to Pharmacokinetic Model-Driven Drug Delivery", IEEE Trans Biomed Eng. vol. 37(1), pp. 107-109, 1990.

Wada and Ward, "The Hybrid Model: A New Pharmacokinetic Model for Computer-Controlled Infusion Pumps", IEEE Trans. Biomed. Eng. vol. 41(2), pp. 134-142, 1994.

Wada and Ward, "Open Loop Control of Multiple Drug Effects in Anesthesia", IEEE Trans. Biomed Eng. vol. 42(7), pp. 666-677, 1995.

Neatpisamvanit and Boston, "Estimation of Plasma Insulin from Plasma Glucose", IEEE Trans Biomed Eng. vol. 49 (11), pp. 1253-1259, 2002.

Gentilini et al., "A New Paradigm for the Closed-Loop Intraoperative Administration of Analgesics in Humans", IEEE Tran Biomed Eng. vol. 49(4). pp. 289-2999, 2002.

Garrett, J.S., Lanzer, P., et al., "Measurement of Cardiac Output by Cine Computed Tomography", Am J Cardiol 56 (10): 657-61, 1985.

Mahnken, A.H., Henzler, D, et al., "Determination of Cardiac Output with Multislice Spiral Computed Tomography: A Validation Study", Invest Radiol 39(8): 451-4, 2004.

Mahnken, A.H., Klotz, E, et al., "Measurement of Cardiac Output from a Test-Bolus Injection in Multislice Computed Tomography", Eur Radiol 13(11): 2498-504, 2003.

International Search Report and Written Opinion for counterpart PCT Application No. PCT/US2005/41913.

Fleischmann, Dominik, "Present and Future Trends in Multiple Detector-Row CT Applications; CT Angiography", Eur. Radiol. 12 (Suppl. 2) 2002.

Korosec, Frank, "Basic Principles of Phase-contrast, Time-of-flight, and Contrast-enhanced MR Angiography", 1999.

Baker, Aaron; et al. "Fluid Mechanics Analysis of a Spring-Loaded Jet Injector." IEEE Transactions on Biomedical Engineering, vol. 46, No. 2, Feb. 1899.

Guytan, A.C., "Circulatory Physiology: Cardiac Output and Regulation", Saunders, Philadelphia, p. 173, ISBN: 07216436004.

\* cited by examiner

IDENTIFICATION OF REGIONS OF INTEREST AND EXTRACTION OF TIME VALUE CURVES IN IMAGING PROCEDURES

CROSS-REFERENCE TO RELATED APPLICATION

This application claims the benefit of U.S. application Ser. No. 12/144,811, filed 24 Jun. 2008, the disclosure of which is incorporated herein by reference.

BACKGROUND OF THE INVENTION

The present invention relates to identification of one or more regions of interest in imaging procedures and, particularly, to identification of one or more regions of interest with a minimum of or without manual intervention and subsequent extraction of time value curves for the one or more regions of interest.

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

Image enhancement via injection of contrast enhancement media or contrast media in imaging procedures (for example, computed tomography or CT, magnetic resonance imaging or MRI, ultrasound imaging, etc.), is well known in the medical and imaging art. In general, a bolus of a contrast medium is injected intravenously and is carried by blood flow to one or more regions of interest (for example, an organ or blood vessel).

In a transit, timing or test bolus scan, a series of single-level or single-plane images are acquired at specified time intervals to determine how contrast propagates through a particular structure. In current practice, one or more regions of interest or ROIs are selected by manually drawing shapes on a single slice. Subsequently, average enhancement within each hand-drawn region of interest is computed for every slice in the time series, generating 1-D curves. FIG. 1A illustrates an example of a scan upon which two regions of interest corresponding to the trunk of the pulmonary artery (P) and the aorta (A) have been hand drawn. FIG. 1B illustrates a representative example of the time enhancement curves that are calculated from a transit, timing or test bolus performed as part of a cardiac Computed Tomography Angiogram or CTA procedure for the two regions of interest.

Accurate and consistent placement of regions of interest in the pulmonary artery and the aorta (and/or other region(s) of interest) is important to achieve desirable results. Accurate and consistent placement of the regions of interest is especially important if the time enhancement curves are to be used for optimization of a diagnostic protocol to be used in an imaging scan. Determining the size, shape, and location of the regions of interest is challenging and requires valuable operator time (for example, to go to a separate evaluation screen, to load the images, to draw the region(s) of interest, and to use the resulting data to generate and/or adjust the contrast/scan protocol).

In a number of procedures, sometimes referred to as tracking test bolus procedures, an operator is required to mark one or more regions of interest prior to contrast being injected. It can be particularly difficult to draw the regions of interest on the image before contrast has been injected. Moreover, factors such as patient movement can result in substantial inaccuracies.

It is desirable to develop improved devices, systems and/or methods for identifying, determining or defining regions of interest, particularly for extraction of time enhancement curves in imaging procedures.

SUMMARY OF THE INVENTION

In one aspect, the present invention provides a method of extracting at least one time-value curve to determine a protocol in an imaging procedure using an imaging system, including: determining a first M-dimensional data set of pixel values of a portion of a body of the patient at a first time using the imaging system, wherein M is an integer; determining at least a second M-dimensional data set of pixel values of the portion at a second time using the imaging system; computing a predetermined number of correlated segments of the imaged portion corresponding to a predetermined number of regions of interest of the patient by computing a similarity metric of a time series of pixel values; computing the at least one time-value curve for at least one of the regions of interest; and determining a protocol for a diagnostic scan using the image system based at least in part upon data from the time value curve.

In several embodiments, a series of 0 through T M-dimensional datasets are determined, wherein T is an integer, and wherein the 0 dataset corresponds to a dataset at time t=0 and the T dataset corresponds to a dataset at time t=T. A vector $y_x=[y_x(0)\ y_x(1)\ \ldots\ y_x(T-1)\ y_x(T)]$ can, for example, be determined wherein y is a value of a pixel at location x.

The segments can, for example, be computed using a clustering technique such as K-means clustering. K clusters can, for example, be computed by minimizing the sum of squares of distances between data points and K cluster centroids, wherein K is an integer corresponding to the predetermined number of correlated segments.

In several embodiments, pixel values are randomly assigned to one of K clusters and each cluster centroid is a component-wise mean of the pixel values in that cluster after centering and normalizing pixel values to a zero mean and unit standard deviation as follows:

$$\hat{y}_x = \frac{y_x - \overline{y}_x}{\sigma_x}$$

wherein the mean $\overline{y}_x$ and standard deviation $\sigma_x$ are calculated using the following formulas:

$$\overline{y}_x = \frac{1}{T}\sum_{i=1}^{T} y_x(i)$$

$$\sigma_x = \sqrt{\frac{1}{T}\sum_{i=1}^{T}(y_x(i)-\overline{y}_x)^2}$$

Each cluster centroid can, for example, be determined using the following formula:

$$y_c = \frac{1}{N}\sum_{x \in cluster} \hat{y}_x$$

wherein N is the number of pixels in the cluster.

The distance from centered and normalized pixel values to each of the K cluster centroids $y_c$ can, for example, be determined using the formula:

$$dist(\hat{y}_x, y_c) = 1 - \frac{1}{T-1} \sum_{t=1}^{T} \hat{y}_x(i) \times y_c(i).$$

Each centered and normalize pixel value can be assigned to the cluster to which it exhibits the minimum computed distance to the centroid.

The actions of determining each cluster centroid, determining a distance from centered and normalized pixel values to each of the K cluster centroids and assigning/reassigning each centered and normalize pixel value to the cluster to which it exhibits the minimum computed distance to the centroid can be repeated until convergence, resulting in a segmented image having K segments corresponding to the determined K clusters.

The method can further include filtering the segmented image to eliminate pixels that are not well correlated with neighboring pixels. Each pixel of the segmented image can, for example, be compared with all eight of its neighboring pixels in filtering.

The method can further include morphologically opening the segmented image.

The method can also include overlaying the segmented image upon a contrast enhanced bolus data set and computing enhancement profiles for each of the K segments.

The method can also further include semantically labeling at least one of the enhancement profiles with a semantic label corresponding to a region of interest of the patient based upon at least one of the characteristics of the labeled enhancement profile as compared to at least one other computed enhancement profiles.

In another aspect, the present invention provides system for extracting at least one time-value curve to determine a protocol in an imaging procedure, including an input system for input of data output from at least one imaging system. The data includes a first M-dimensional data set of pixel values of a portion of a body of the patient at a first time, wherein M is an integer, and at least a second M-dimensional data set of pixel values of the portion at a second time. The system also includes at least one processor in communicative connection with the input system and adapted to compute a predetermined number of correlated segments of the imaged portion corresponding to a predetermined number of regions of interest of the patient by computing a similarity metric of a time series of pixel values and computing the at least one time value curve for at least one of the regions of interest. The system also includes at least one parameter generator system to determine a protocol for a diagnostic scan using the image system based at least in part upon data from the time value curve.

The system can further includes a memory system in communicative connection with the at least one processor. The memory system has stored therein an algorithm executable by the at least one processor to compute the predetermined number of correlated segments of the imaged portion corresponding to the predetermined number of regions of interest of the patient.

The system can, for example, be in communicative connection with the at least one imaging system. The system can, for example, be in communicative connection with the at least one injector system.

In several embodiments, at least a portion of the system is integrated with the at least one imaging system. Likewise, at least a portion of the system can be integrated with the at least one injector system.

The present invention, along with the attributes and attendant advantages thereof, will best be appreciated and understood in view of the following detailed description taken in conjunction with the accompanying drawings.

DETAILED DESCRIPTION OF THE INVENTION

In several embodiments of the present invention, one or more regions of interest are determined in a portion of a patient's body by the devices, systems and/or methods of the present invention via analysis of a plurality of datasets of values (for example, pixel values) of the portion of the patient's body (in a time series of such datasets) without the requirement that an operator manually draw or otherwise define the regions of interest. The dataset of values (for example, point values such as pixel intensity values) need not be displayed to an operator as a viewed image during determination of the one or more regions of interest. In a number of embodiments, after one or more regions of interest are determined, time value curves (for example, time enhancement curves in the case that a contrast enhancement medium is injected) for the regions of interest are computed from the dataset series (for example, a contrast-enhanced transit bolus image series).

As used herein, the term "pixel" refers to a defined portion or piece (typically, the smallest portion or piece) of data in an M-dimensional dataset of the present invention. In several embodiments, the M-dimensional datasets of the present invention correspond to two-dimensional datasets corresponding to a two-dimensional digital image wherein each pixel has a pixel value or intensity. Three-dimensional images can also be used and the term pixel as used herein includes the term "voxel." Multidimensional datasets can, for example, be created using data from more than one type of imaging system (for example, a combination of data from CT and MRI systems).

Figure 1A:
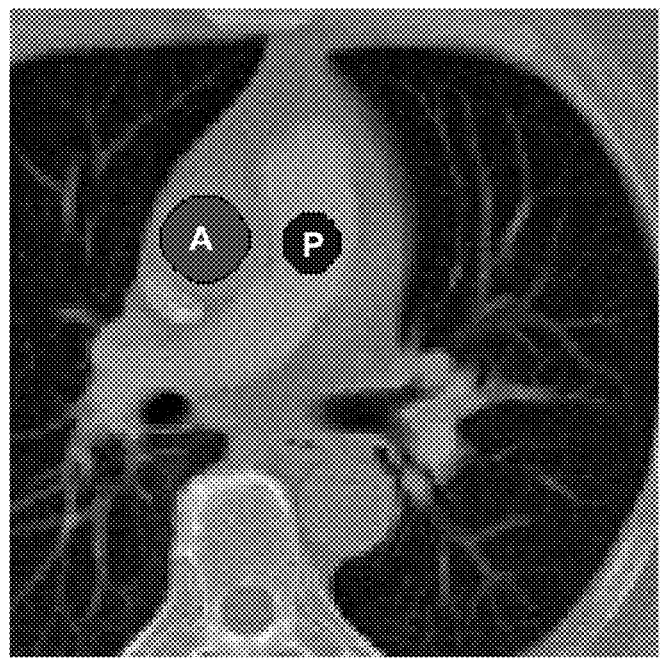
FIG. 1A illustrates operator-drawn regions of interest corresponding to the pulmonary artery and the aorta in a CT image.
Figure 1B:
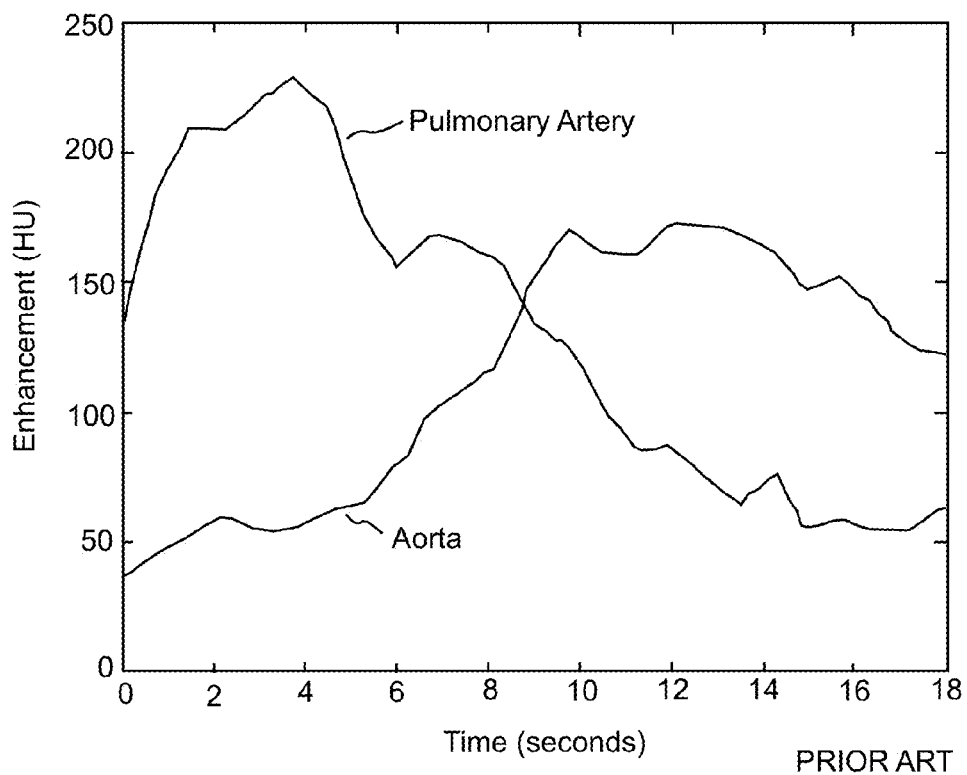
FIG. 1B illustrates time enhancement curves calculated for the operator-determined regions of interest of FIG. 1A.

To explain one embodiment of the present invention, the same CT transit bolus series illustrated in FIG. 1 is used as a representative example. Time enhancement curves for the pulmonary artery and for the aorta are computed. Those skilled in the art appreciate that the devices, systems and methods of the present invention can be used in connection with generally any region(s) of interest and in connection with generally any imaging methodology (for example, CT, MRI etc.) in which energy is applied to a patient to produce a dataset or image. Further, the devises, systems and methods of the present invention can be used without the injection of a contrast medium.

As each image in the series is acquired at a single level, each pixel intensity value of the computed digital images corresponds to a single spatial location, given little or no patient motion. A pixel at location represented by the variable x has an enhancement profile vector defined as:

$$y_x = [y_x(0) y_x(1) \ldots y_x(T-1) y_x(T)]$$

The enhancement level y of a pixel at location x is defined over time as:

$$y_x(t) = y_x(0) + s_x(t) + \eta_x(t)$$

where $y_x(0)$ is the baseline enhancement for the pixel, s is the change in signal due to blood flow, and $\eta$ is a noise term (assumed in several embodiments of the present invention to be spatially and temporally independent). In contrast-enhanced imaging, s is related to the amount of contrast in the blood, and that value changes depending on location in space and time. For those pixels corresponding to an area through where blood does not flow, $s_x(t)=0$, and the only enhancement differences will be uncorrelated noise. For those pixels corresponding to an area through which blood does flow, $s_x(t)$ will be well correlated within a region of interest circumscribing a specific territory of the anatomy, (for example, all pixels in the pulmonary trunk will have a similar enhancement pattern).

The representative examples provided herein show contrast-enhanced computed tomography in a test bolus scan. For phase-contrast and time-of-flight magnetic resonance imaging, however, exogenous contrast is not necessary to obtain a signal change in flowing blood. Enhancement/signal change is instead achieved by adjusting the magnetization to obtain large magnetization from moving blood spins and a diminished signal from stationary tissue spins. See, for example, Frank R. Korosec. "Physical Principles of Phase-contrast, Time-of-flight, and Contrast-enhanced MR Angiography." 41st Annual Meeting of the American Association of Physicists in Medicine. Jul. 25-29, 1999. Regardless of the method used to obtain enhanced images, the processing described herein remains unchanged.

Figure 2:
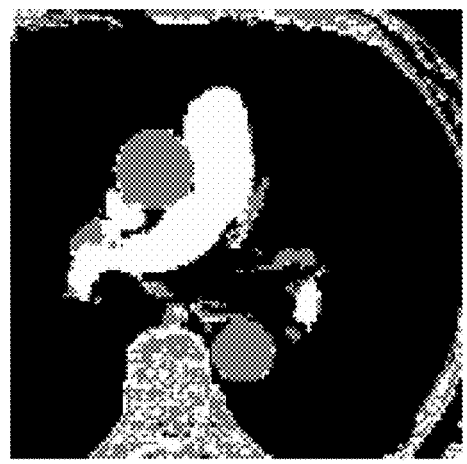
FIG. 2 illustrates an image that is segmented or labeled (cluster 1 in grey, and cluster 2 in white) after a segmenting procedure of the present invention.
Figure 3:
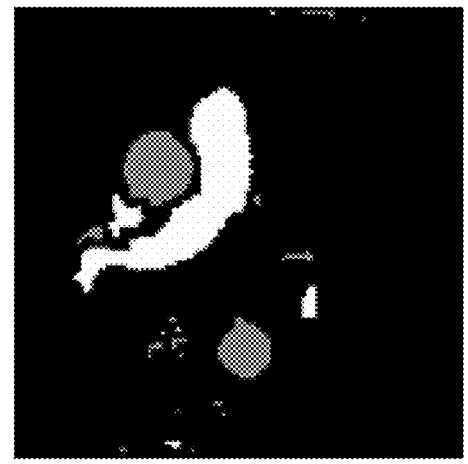
FIG. 3 illustrates the segmented or labeled image after a filtering procedure of the present invention based on similarity to neighboring pixel values.
Figure 4:
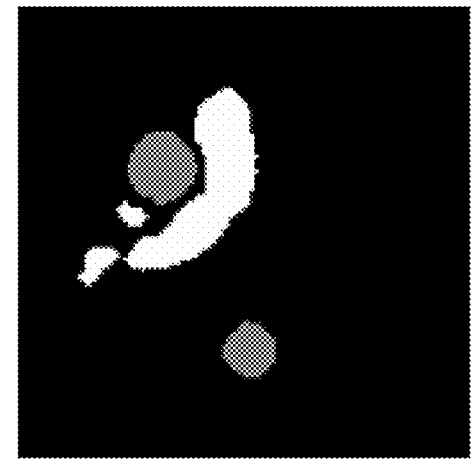
FIG. 4 illustrates the segmented or labeled image after a morphological opening procedure of the present invention.

In one embodiment of the present invention, the data is first thresholded to exclude obviously non-contrast-enhanced regions (for example, compare the images of FIGS. 1A and 2). For the CT images of the representative embodiment hereof, the dataset can, for example, include all points with at least one non-zero enhancement value in the time series.

In several embodiments of the present invention, an undirected or unsupervised clustering technique such as K-means clustering was used to segment the time series of images.

K-means clustering is an algorithm used to classify, group or segment objects based on attributes thereof into K groups, wherein K is a positive integer number. In general, grouping is accomplished by minimizing the sum of squares of distances between data points and a corresponding cluster centroid.

In the representative example of FIGS. 2 through 5B, K-means clustering [1, 2] was performed with K=2 as two regions of interest/time enhancement curves were desired. The distance metric used in the K-means clustering procedure was one minus the sample correlation between points (treated as sequences of values). Each cluster centroid was the component-wise mean of the points in that cluster, after centering and normalizing those points to, for example, zero mean and unit standard deviation.

The mean and standard deviation for each pixel were computed as follows:

$$\bar{y}_x = \frac{1}{T} \sum_{i=1}^{T} y_x(i)$$

$$\sigma_x = \sqrt{\frac{1}{T} \sum_{i=1}^{T} (y_x(i) - \bar{y}_x)^2}$$

Before the clustering process was initiated, the time series for each pixel was normalized to zero-mean and unit standard deviation as follows:

$$\hat{y}_x = \frac{y_x - \bar{y}_x}{\sigma_x}$$

Subsequently, pixels were randomly assigned to the K clusters. For each cluster, the cluster centroid was computed as follows:

$$y_c = \frac{1}{N} \sum_{x \in cluster} \hat{y}_x$$

where N is the number of pixels in the cluster. The centroid is a T-dimensional, normalized enhancement profile.

The distance from every pixel to each of the K cluster centroids $y_c$ was computed as follows:

$$dist(\hat{y}_x, y_c) = 1 - \frac{1}{T-1} \sum_{t=1}^{T} \hat{y}_x(i) \times y_c(i)$$

Low computed distances correspond to high correlations, while high computed distances correspond to low correlations. Other potential distance metrics could include Euclidean distance, sum of absolute differences (city-block distance), and the cosine of the two feature vectors. Generally, a similarity metric can be thought of as the inverse of a distance metric. The closer two elements are in the selected feature space, the shorter the distance and the greater the similarity.

Each pixel was then assigned to the cluster to which it exhibited the minimum computed distance to the centroid.

The above-defined steps were repeated until the cluster assignments converged, which was (in several embodiments) defined as a state wherein cluster centroids and assignments were stable. For example, convergence can be obtained when the points no longer switch clusters, switch clusters in a stable, oscillating or steady state manner or centroids are no longer changed. After such K-means convergence, a labeled or segmented image was generated as illustrated in FIG. 2 wherein a first cluster or cluster 1 is represented by a gray color and a second cluster or cluster 2 is represented by a white color.

In several studies of the present invention, the labeled or segmented image was then filtered. For example, each pixel value can be compared to one or more of its neighboring pixel values. In one embodiment, for each pixel, if all eight of its neighbors matched its own label or segment, the pixel kept its label or segment. Otherwise, the pixel was set to zero. This filtering process or procedure eliminates pixels on the edges of structures and those that are not correlated with their neighbors. Such filtering of the data of FIG. 2 yielded the image of FIG. 3. In the studies of FIGS. 2 through 5B, after filtering, a morphological opening (as known in the computer vision and image processing arts) was performed with, for example, a disc-shaped structuring element to eliminate small objects or islands (see FIG. 4). In general, morphological opening removes small objects/noise using a structuring element. Morphological opening can be defined as an erosion on an image followed by a dilation on the eroded image, using the same structuring element. When performing erosion on a binary image, a structuring element is superimposed on each of the foreground pixels. If the structuring element is not entirely contained within the foreground, the pixel at that coordinate is removed. Erosion causes foreground regions to shrink, removing isolated areas smaller than the structuring element. For dilation, the structuring element is superimposed on each of the background pixels. If at least one pixel is contained within the foreground, the pixel at that coordinate is added. When dilation is performed on an eroded image (with the same structuring element), regions that were not removed during erosion are returned to their original size. Foreground borders are somewhat smoothed, and small islands are removed.

Figure 5A:
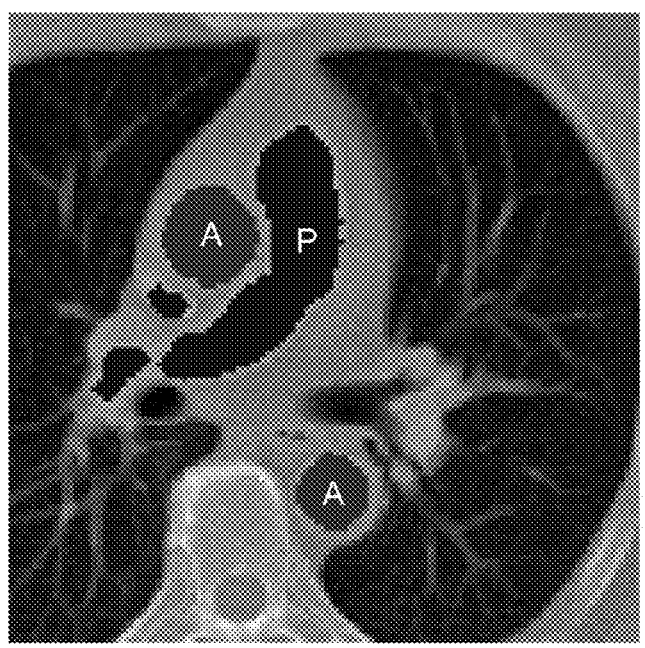
FIG. 5A illustrates the final, segmented or labeled image overlain on original axial data showing the identified segments or regions of interest (corresponding to the pulmonary artery P and the aorta A).
Figure 5B:
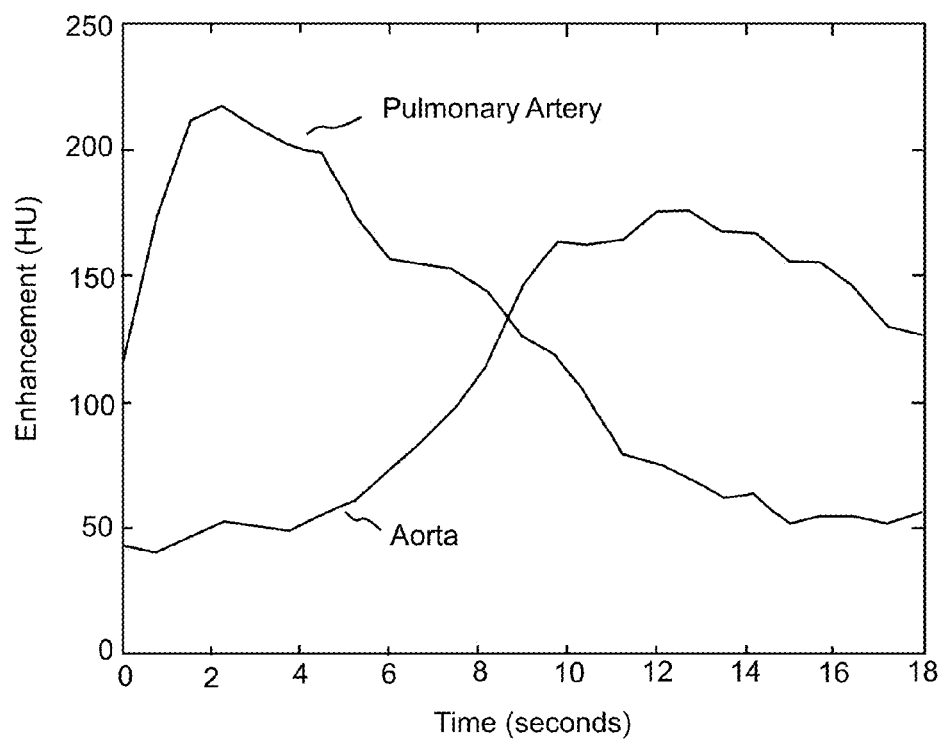
FIG. 5B illustrates time enhancement curves calculated for the automatically or system-determined segments or regions of interest of FIG. 5A.

The labeled or segmented image was then overlaid upon the original transit bolus data set as illustrated in FIG. 5A. The mean enhancement profiles for each segment or labeled cluster mask (that is, region of interest) was determined Time enhancement curves were computed in the same manner as they would be for manually drawn regions of interest. Depending on one or more characteristics of the corresponding time enhancement curves (for example, the time to peak of each of the profiles), each cluster can be given a semantic label as illustrated in FIG. 5A. For example, in the representative example, the pulmonary artery is known to peak first, so the cluster with the earlier time to peak was determined to be to the pulmonary artery.

In a number of embodiments of the present invention, time-value curves (for example, time-enhancement curves) determined using the computed regions of interest of the present invention are used to facilitate determination of a protocol for an imaging procedure. As used herein with respect to an imaging procedure, the term "protocol" refer to injection parameters (in the case of injection of a contrast medium) and/or scanner/imaging system parameters for use in a procedure such as a diagnostic imaging scan. Injection parameters include, for example, flow rate, volume injected, injection duration, contrast agent concentration etc. that define, for example, the timing of, amount of, and/or the nature of fluid(s) to be delivered to a patient during an injection procedure. Such parameters can change over the course of the injection procedure. As used herein, the term "phase" refers generally to a group of parameters that define, for example, the timing of, amount of, and/or the nature of fluid(s) to be delivered to a patient during a period of time (or phase duration) that can be less than the total duration of the injection procedure. Thus, the parameters of a phase provide a description of the injection over a time instance corresponding to the time duration of the phase. An injection protocol for a particular injection procedure can, for example, be described as uniphasic (a single phase), biphasic (two phases) or multiphasic (two or more phases, but typically more than two phases). Multiphasic injections also include injections in which the parameters can change continuously over at least a potion of the injection procedure.

Scanner or imaging system parameters that can be determined include, but are not limited to, the amount of radiation transmitted to the patient, power inputs (for example, voltage or current), timing (for example, scan start time, stop time, delay time and/or duration).

Figure 6:
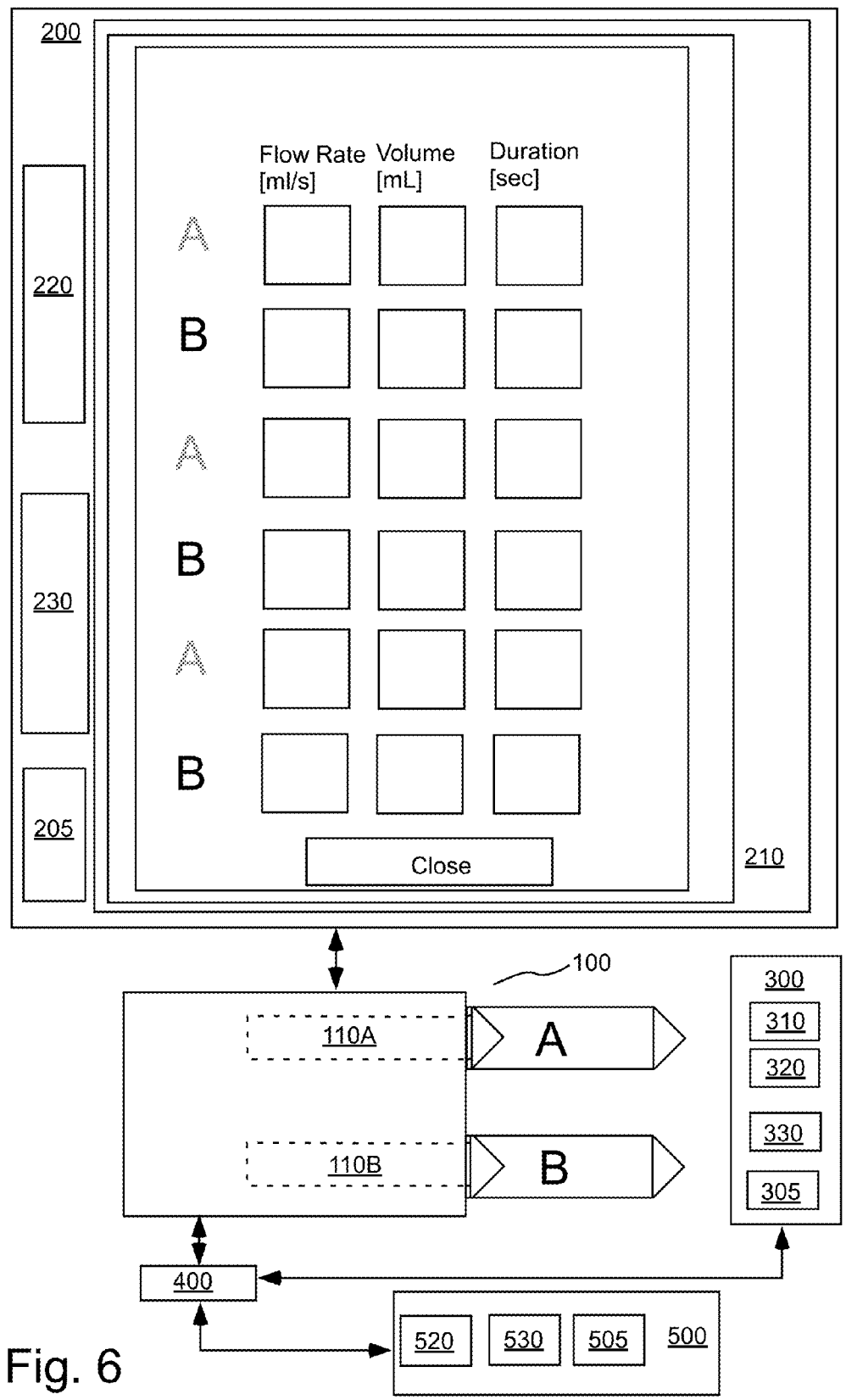
FIG. 6 illustrates one embodiment of a system of the present invention.

Use of time enhancement curves to determine imaging procedure protocols is, for example, described in PCT Application No. PCT/US08/67982, PCT Application No. PCT/US2007/026194, Published PCT Application No. WO/2006/058280 and Published PCT Application No. WO/2006/055813, the disclosures of which are incorporated herein by reference and made a part hereof In several embodiments of the present invention, an injection system (such as a dual syringe injector system 100 as illustrated in FIG. 6 and as, for example, disclosed in U.S. Pat. No. 6,643,537, Published U.S. Patent Application Publication No. 2004-0064041 and PCT International Patent Application No. PCT/US2007/026194) for use with the present invention includes two fluid delivery sources (sometimes referred to as source "A" and source "B" herein; such as syringes) that are operable to introduce a first fluid and/or a second fluid (for example, contrast enhancement fluid, saline etc.) to the patient independently (for example, simultaneously, simultaneously in different volumetric flow proportion to each other, or sequentially or subsequent to each other (that is, A then B, or B then A)). In the embodiment of FIG. 6, source A is in operative connection with a pressurizing mechanism such as a drive member 110A, and source B is in operative connection with a pressurizing mechanism such as a drive member 110B. The injection system includes a control system 200 in operative connection with injector system 100 that is operable to control the operation of drive members 110A and 110B to control injection of fluid A (for example, contrast medium) from source A and injection of fluid B (for example, saline) from source B, respectively. Control system 200 can, for example, include or be in communicative connection a user interface comprising a display 210. In the illustrated embodiment, display 210 illustrates areas for parameters for injection flow rate, injection volume and injection duration for, for example, three phases of injection or fluid A and/or fluid B. The parameters for one or more such phases can be populated using one or more parameter generation systems and methods based at least in part on data obtained from time enhancement curves for regions of interest determined as described herein. A user can be provided with the option to adjust and/or override the parameters generated (for example, via a manual input system 205 including a keypad, keyboard, mouse etc. as known in the computer arts). Control system 200 can include a processor 220 (for example, a digital microprocessor as known in the art) in operative connection with a memory or memory system 230.

As clear to one skilled in the art, may fluid delivery systems, including multi-patient fluid delivery systems as, for example, disclosed in U.S. Pat. Nos. 7,326,186, 7,094,216, 6,866,654, 6,972,001, 6,699,219, 6,471,674, 6,306,117, 6,149,627, 6,063,052, 5,920,054, 5,843,037, 5,827,219, 5,739,508 and 5,569,181 are also suitable for use in the present invention.

Imaging system 300 can, for example, be a CT system, a Magnetic Resonance Imager (MRI) system, an ultrasound imaging system, or a Positron Emission Tomography (PET) system) or a Single Photon Emission Computed Tomography (SPECT) system as described above. The injection system can be in communicative connection with imaging system 300. Imaging system 300 and injector system 100 can, for example, be in communication connection via input/output ports (represented by terminations of arrows in FIG. 6) as known in the art. In FIG. 6, imaging system 300 and injector system 100 are, for example, illustrated to be in communicative connection via a common communication hub 400. Alternatively, a direct communication link can be established. Further data from one of imaging system 300 and injection systems 100 can be manually entered using one or more manual input systems (for example, keypads, keyboards mousse etc.) as know in the computer arts. Imaging system 300 and injector system or injector 100 can also be partially or fully integrated as described, for example, in Published PCT International Patent Application No. WO 2008/011401, the disclosure of which is incorporated herein by reference. One, a plurality or all the illustrated components of the injection system and imaging system 300 can also or alternatively be integrated with or incorporated within another, separate component that is placed in communicative connection with other system components.

Software embodying the systems and methods of the present invention (as well as parameter generation systems and methods) can, for example, be embodied within one or more separate or standalone systems represented by system 500 which can, for example, include at least one processor (for example, a digital microprocessor), a memory system 520 a display 510 and a manual input system 505. In the embodiment, illustrated in FIG. 6, system 500 is shown to be in communicative connection with communication hub 400. As described above, a direct communication link can also be established. Further data from one or more systems can be manually entered into one or more other systems using one or more manual input systems (for example, keypads, mouse etc.) as know in the computer arts. Software embodying the systems and methods of the present invention (as well as parameter generation systems and methods) can, for example, be stored in memory 530 and executed by processor 520. As clear to one skilled in the art, all or a portion of the functionality of the methods and/or systems of the present invention can alternatively reside in an imaging system 300 (which can, for example, include at least one processor 320, a memory system 330, a display 310 and a manual input system 305) and/or in injector system 100.

Data obtained from transit boluses using regions of interest as determined herein can be used in many ways to, for example, determine imaging procedure protocols. In several representative embodiments of the present invention, at least one parameter for an imaging procedure (which, includes the injection of a contrast enhancement fluid or medium which includes a contrast enhancing agent) is determined via a parameter generation system/methodology as described in, for example, PCT Application No. PCT/US08/67982. In that regard, discrete point data from one or more contrast enhancement curves for one or more regions of interest determined as described herein is substituted into a model to, for example, determine values for physiological variables in the model. The variables can, for example, be related to cardiopulmonary function.

In that regard, variables in a model that is predictive of temporal changes in concentration in a region or regions of interest within a patient are determined or estimated using data from at least one concentration profile for a pharmaceutical (that is, concentration as a function of time) in at least one region of interest. Depending upon the number of variables present within the model, a number of discrete data points are taken from one or more contrast concentration profiles (that are, for example, provided by time enhancement curves generated using an imaging system) to provide an estimation of the values of such variables. In a number of models, such variables are related to cardiopulmonary function (that is, cardiac, pulmonary and vascular function/dynamics). For example, in a representative embodiment of a model used in the present invention, two variables, cardiac output ($Q_{CO}$) and blood volume ($V_B$), are unknown. Two discrete data points (that is, two concentrations at two times) are used to determine estimates of those variable.

Figure 7:
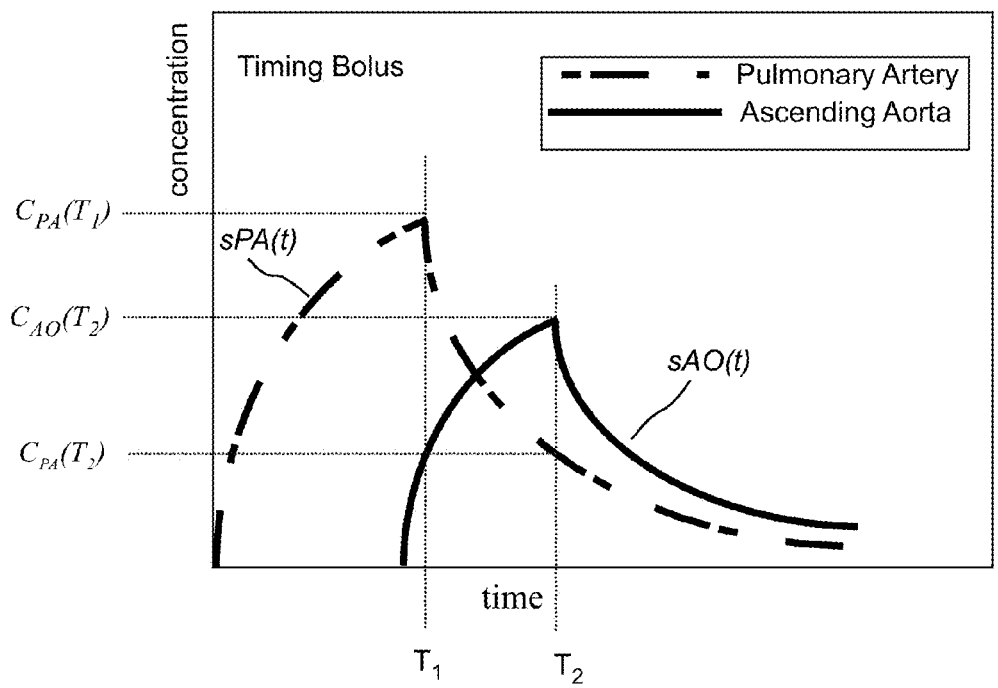
FIG. 7 illustrates a concentration/enhancement versus time curve for a transit, timing or test bolus of a contrast medium in the trunk of the pulmonary artery and the ascending aorta.

In several embodiments, a time to peak enhancement for first region of interest enhancement $T_1$ and a time to peak enhancement for the second region of interest enhancement $T_2$ are input into the parameter generation system (algorithms for which can, for example, be embodied in software stored on one or more of memory systems 230, 330 and 530). In several embodiments, the first region of interest is the pulmonary artery and the second region of interest is the ascending aorta (see, for example, FIG. 7). Concentration at peak enhancement for the first region of interest enhancement $C_1(T_1)$ and concentration at peak enhancement for the second region of interest enhancement $C_2(T_2)$ are also input.

The distribution of contrast material injected into each region of interest from a peripheral injection site can, for example, be described by the following analytical solution of a physiological model:

$$C_o(t) = \begin{cases} \dfrac{Q_{inj}}{Q_{co}} C_i \left(1 - e^{-\frac{Q_{CO}}{V_B} t}\right) & t \leq T_{inj} \\ C_o(T_{inj}) e^{-\frac{Q_{CO}}{V_B}(t - T_{inj})} & t > T_{inj} \end{cases} \quad (1)$$

wherein the origin, t=0, corresponds to the time at which contrast arrives in the region of interest, $Q_{inj}$ [ml/s] is the injection flow rate, $T_{inj}$ [s] is the injection duration, $Q_{CO}$ is the cardiac output [ml/s], $V_B$ is the blood volume between the injection site and measurement point [ml], $C_i$ is the concentration of contrast in a contrast source from which contrast is injected into the patient, and $C_O(t)$ is the blood concentration in the region of interest of the agent at time t.

Concentration can, for example, be related to enhancement level by the formula:

$$C_O(t) = s(t)/K \quad (2)$$

wherein s(t) [Hounsfield units or HU] is enhancement level at time t and K [mgI/ml] is a conversion factor.

$T_{inj}$ can, for example, be the amount of time between arrival of contrast enhancement agent and the time to peak enhancement.

Blood concentration at $T_{inj}$ can be provided by:

$$C_o(T_{inj}) = \frac{\max s_2(T_2)}{K} = C_2(T_2) \quad (3)$$

wherein max $s_2(T_2)$ [Hu] is the maximum enhancement level in the second region of interest and $C_2(T_2)$ is the concentration at peak enhancement for the second region of interest enhancement.

Contrast enhancing agent concentration on the first contrast enhancement curve at time $T_2$ can be related to a contrast enhancing agent concentration on the second contrast enhancement curves at time $T_2$ using the following equation $$C_1(T_2) \approx C_1(T_1) - C_2(T_2) \quad (4).$$

Blood volume $V_B$ can be determined using one of the following formulas:

$$V_B = \frac{-T_1 Q_{CO}}{\log\left[1 - \frac{C_1(T_1)}{Q_{inj} C_i} Q_{CO}\right]} \quad (5)$$

$$V_B = \frac{-(T_2 - T_1) Q_{CO}}{\log\left[\frac{C_1(T_1) - C_2(T_2)}{C_1(T_1)}\right]}.$$

Cardiac output $Q_{CO}$ can be determined using the following formula:

$$Q_{CO} = \frac{Q_{inj}}{C(T_1)} C_i \left[1 - \left(\frac{C_1(T_1) - C_2(T_2)}{C_1(T_1)}\right)\right]^{\frac{T_1}{T_2 - T_1}}. \quad (6)$$

$Q_{CO}$ can be used in the model in which $Q_{CO}$ is a variable to determine the at least one parameter.

The concentration of contrast agent at peak enhancement $C(T_{Peak})$ at the time of peak enhancement $T_{Peak}$ in the second region of interest of an imaging injection can be related to the injection flow rate $Q_{inj}$ of the imaging injection and the injection duration $T_{inj}$ of the imaging injection using the formula:

$$C(T_{Peak}) = \frac{Q_{inj}}{Q_{CO}} C_i \left[1 - e^{\frac{-Q_{CO}}{V_B} T_{inj}}\right] \quad (7)$$

A concentration of contrast agent in the second region of interest at time of a scan start, $C(T_{start})$, can be provided by:

$$C(T_{start}) = \frac{\frac{Q_{inj}}{Q_{CO}} C_i \left[1 - e^{\frac{-Q_{CO}}{V_B} T_{inj}}\right]}{1 - e^{\frac{-Q_{CO}}{V_B} T_{inj}} + e^{\frac{-Q_{CO}}{V_B}(T_{inj} - \Delta T)}} \quad (8)$$

wherein $\Delta T$ is the scan duration and wherein $C(T_{start})$ is equal to $C(T_{start} + \Delta T)$ in this embodiment.

$C(T_{Peak})$ and $C(T_{start})$ enhancements can, for example, be determined for admissible input values for $T_{inj}$ and $Q_{inj}$ wherein a maximum $Q_{inj}$ and a minimum $Q_{inj}$ and a maximum $T_{inj}$ and a minimum $T_{inj}$ can be established. Maximum $T_{inj}$ can, for example, be established as a function of scan duration plus a constant, and minimum $T_{inj}$ can, for example, be established as the scan duration.

The values for the diagnostic protocol flow rate $Q^*_{inj}$ and injection duration $T^*_{inj}$ can, for example, be determined which are the arguments that minimize the cost function (wherein "Desired" values are provided/input by, for example, an operator):

$$Q^*_{inj}, \quad (9)$$
$$T^*_{inj} = \underset{Q_{inj} T_{inj}}{\mathrm{argmin}}(|DesiredPeak - C(T_{Peak})| + |DesiredTarget - C(T_{start})|).$$

A total contrast volume in a diagnostic phase can be determined by the formula $$Vol_{tot} = Q_{inj} \cdot T_{inj}.$$

A scan delay can, for example, be computed by estimating a bolus arrival time using the formula:

$$\text{scanDelay} = T_2 - (T_{injTB} + arr\text{Offset}) + T_{start} \quad (10)$$

wherein $T_{injTB}$ is the injection duration of the timing bolus and arrOffset is an arrival time offset value; and a scan end time can be determined by adding the scan delay to the scan duration.

An arrival time of contrast in the right heart can, for example, be computed using the formula $$T_{arrRH} = T_1 - (T_{injTB} + arr\text{Offset}) \quad (11)$$

wherein $T_{1peak}$ is the time to peak enhancement in the first region of interest.

The injection can be truncated if $(T_{inj} + T_{arrRH}) >$ scanEnd. The injection can, for example, be truncated so that it is finished at least $T_{arrRH}$ seconds before end of the scan as follows:

$$T_{inj} = \text{scanEnd} - T_{arrRH}. \quad (12)$$

A duration of a dual flow phase wherein both contrast medium and a diluent are injected can also be determined. A ratio of contrast medium to diluent can be established for the dual flow phase. The end time of the dual flow phase can, for example be established to be equal to $T_{inj}$.

Figure 8:
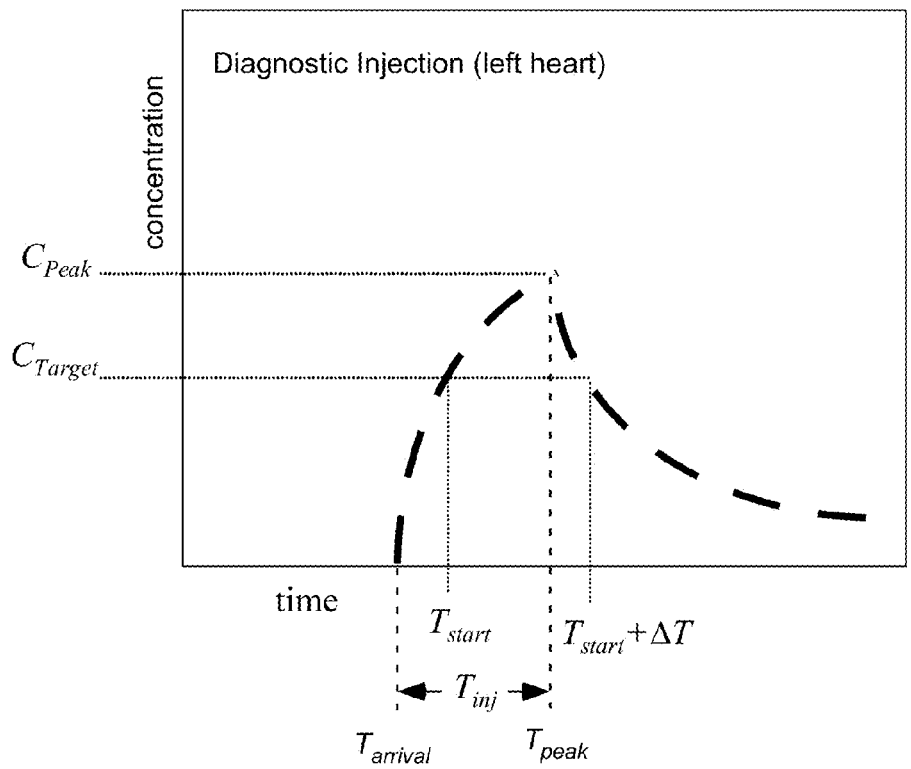
FIG. 8 illustrates a concentration/enhancement versus time curve in the left heart for a diagnostic injection of contrast medium.

A protocol generation methodology as described above can, for example, be used to minimize the dose of contrast a subject receives by considering that subject's cardiac dynamics, drug properties and scan properties. As, for example, illustrated in FIG. 8, the scan begins at $T_{start}$, on an unknown point on the upslope of the left heart concentration curve. The scan ends $\Delta T$ seconds later (where $\Delta T$ is the specified scan duration) on the downslope of the curve. To time the scan window in a manner to achieve relatively high and consistent enhancement, those two values (referred to as $C_{LH\text{-}Start}$ on the upslope and $C_{LH\text{-}End}$ on the downslope) should be as close to $C_{LH\text{-}Target}$ as possible. The right heart curve has similar associated parameters. However, because $C_{RH\text{-}Peak}$ should not occur during the scan window (as too much enhancement in the right heart could lead to streaking or beam hardening artifacts), it was not included as a term in the cost function set forth in Equation (9).

Figure 9:
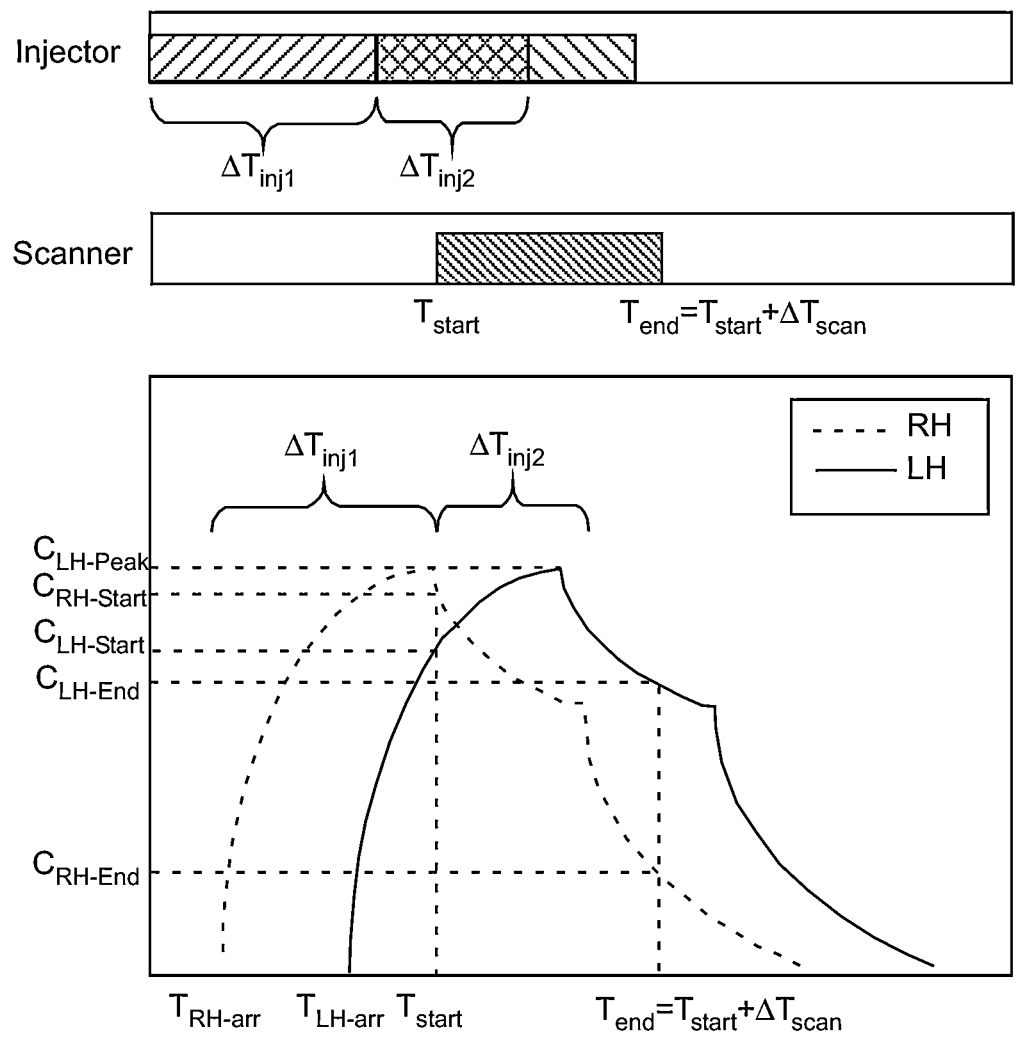
FIG. 9 illustrates an example of relative timing and diagnostic injection protocol phases, scan and enhancement curves for the left heart (LH) and the right heart (RH).

In another embodiment of a protocol generation method, parameters are added in the optimization procedure related to the dilution phase. For example, the dilution ratio ($R_2$) and the duration of the dilution phase ($\Delta T_{inj2}$) can be added to the optimization procedure. The dilution ratio is thereby personalized (instead of using a fixed or set ratio of, for example, 40/60). Further, there is no need to adjust the computed protocol after optimization. Enhancement targets are also added to the optimization procedure (for example, cost function) for a second region of interest (the right heart or RH in the representative examples herein) in this embodiment. Because the best placement of the scan window does not depends solely on left heart or LH enhancement in the representative examples of this embodiment set forth herein, there is no analytic expression for $T_{start}$. $T_{start}$ is thus also included as a parameter in the optimization procedure. FIG. 9 illustrates an example of relative timing and diagnostic injection protocol phases, scan and enhancement curves for the right heart/pulmonary artery and left heart/aorta.

Another term was added to cost function as a penalty on the total volume of contrast injected (see the last term of the cost function of Equation (13)). Weighting factors such as $\alpha$, $\beta$, and $\gamma$ in Equation (13) were included to allow for adjustment of the relative importance of the terms of the cost function. For example, by using a small value for $\alpha$, error in right heart enhancement is penalized less heavily than error in left heart enhancement. Because the scan window is not centered on the right heart peak, it is typical that $C(T_{RH-Start})$ or $C_{RH-Start}$ will be too high and $C(T_{RH-End})$ $C_{RH-End}$ will be too low. Therefore, to avoid having the optimization dominated by such errors in right heart enhancement, set $\alpha$ was set to equal 0.5 in several embodiments. $\beta$ was set to equal 1 in several embodiments, which was shown to be a reasonable trade-off between losing consistency with the test bolus flow rate and not reaching target enhancement levels. In several embodiments $\gamma$ was set to equal 1000, which puts a very large penalty on exceeding the loaded contrast volume. In that regard, if $(Q_{inj}(R_1\Delta T_{inj1}+R_2\Delta T_{inj2})>V_{Load})$ was true, $\gamma$ was set to equal 1000. Otherwise, $\gamma$ was set to equal 0.

$$T_{start}^*, Q_{inj}^*, R_1^*, \Delta T_{inj1}^*, R_2^*, \quad (13)$$

$$\Delta T_{inj2}^* = \operatorname*{argmin}_{\substack{T_{start},Q_{inj},\\R_1,\Delta T_{inj1},\\R_2,\Delta T_{inj2}}} \begin{pmatrix} |C_{LH-Peak} - C_{LH-Peak-Desired}| + \\ |C_{LH-Start} - C_{LH-Target-Desired}| + \\ |C_{LH-End} - C_{LH-Target-Desired}| + \\ \alpha|C_{RH-Start} - C_{RH-Target-Desired}| + \\ \alpha|C_{RH-End} - C_{RH-Target-Desired}| + \\ \beta|Q_{inj} - Q_{TB}| + \\ \gamma, \text{if}(Q_{inj}(R_1\Delta T_{inj1} + R_2\Delta T_{inj2}) > V_{Load}) \end{pmatrix}$$

Depending on the dilution ratios, the peak value for the LH occurs during the upslope (phase 1) or dilution phase (phase 2), and is therefore the greater of the two:

$$C_{LH-Peak} = \frac{Q_{inj}}{Q_{CO}} C_i R_1 \left(1 - e^{\frac{-Q_{CO}}{V_B}\Delta T_{inj1}}\right) \quad (14)$$

or $$C_{LH-Peak} = \frac{Q_{inj}}{Q_{CO}} C_i R_1 \left(1 - e^{\frac{-Q_{CO}}{V_B}\Delta T_{inj1}}\right) e^{\frac{-Q_{CO}}{V_B}\Delta T_{inj2}} + \quad (15)$$

$$\frac{Q_{inj}}{Q_{CO}} C_i R_2 \left(1 - e^{\frac{-Q_{CO}}{V_B}\Delta T_{inj2}}\right)$$

For the remaining concentration values, given an absolute time T (either the start or end of the scan), the RH and LH curves can each be in one of 3 regions—upslope (phase 1), dilution (phase 2), or decay (phase 3). When $T<(T_{arr}+\Delta T_{inj1})$, the expression is:

$$C_T = \frac{Q_{inj}}{Q_{CO}} C_i R_1 \left(1 - e^{\frac{-Q_{CO}}{V_B}\Delta(T-T_{arr})}\right) \quad (17)$$

Note that $T_{arr}$ is either $T_{RH-arr}$ or $T_{LH-arr}$, depending on which curve is being used. For the dilution phase (phase 2), when $(T_{arr}+\Delta T_{inj1})<T<(T_{arr}+\Delta T_{inj1}+\Delta T_{inj2})$, the expression is:

$$C_T = \frac{Q_{inj}}{Q_{CO}} C_i R_1 \left(1 - e^{\frac{-Q_{CO}}{V_B}\Delta T_{inj1}}\right) e^{\frac{-Q_{CO}}{V_B}(T-(T_{arr}+\Delta T_{inj1}))} + \quad (18)$$

$$\frac{Q_{inj}}{Q_{CO}} C_i R_2 \left(1 - e^{\frac{-Q_{CO}}{V_B}(T-(T_{arr}+\Delta T_{inj1}))}\right)$$

Finally, in the decay phase (phase 3), when $T>(T_{arr}+\Delta T_{injA}+\Delta T_{injAB})$, the expression is:

$$C_T = \begin{pmatrix} \frac{Q_{inj}}{Q_{CO}} C_i R_1 \left(1 - e^{\frac{-Q_{CO}}{V_B}\Delta T_{inj1}}\right) e^{\frac{-Q_{CO}}{V_B}\Delta T_{inj2}} \\ + \frac{Q_{inj}}{Q_{CO}} C_i R_2 \left(1 - e^{\frac{-Q_{CO}}{V_B}\Delta T_{inj2}}\right) \end{pmatrix} \quad (19)$$

$$e^{\frac{-Q_{CO}}{V_B}(T-(T_{arr}+\Delta T_{inj1}\Delta T_{inj2}))}$$

Therefore, to find a given concentration on a given curve at a given time, one specifies the arrival time corresponding to the curve (RH or LH), determines which phase is occurring at time T, and uses the appropriate equation as set forth above.

Although the search space grows from a two-dimensional search space in Equation (9) to six-dimensional search space in Equation (13), a brute force search strategy can still be implemented. The parameter range is well defined, the solution manifold is well behaved and the computational burden needed to search for the minimum is still not significant in the case of a relatively coarsely sampled grid (for example, flow rates at 0.1 ml/s, dilution ratios at 10%, and times at 1 second). Further, a computation time of several seconds in the interval between parameter entry and protocol generation has no impact on the imaging procedure.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A method of extracting time-value curves for use in determining a protocol for a diagnostic imaging procedure to be performed on a patient, comprising:
    (a) determining a series of 0 through T M-dimensional data sets of pixel values from a series of images of a cardiovascular system of the patient acquired using an imaging system, wherein M is an integer, T is an integer, the 0 data set corresponds to a data set at a time 1=0, the T data set corresponds to a data set at a time t=T, and wherein a pixel at a location represented by a variable x has an enhancement profile vector defined as:

$$y_x=[y_x(0)y_x(1)\ldots y_x(T-1)y_x(T)]$$

and an enhancement level y of the pixel at the location x is defined over time as:

$$y_x(t)=y_x(0)+s_x(t)+\eta_x(t)$$

wherein $y_x(0)$ is a baseline enhancement level for the pixel, s is a change in signal due to flow of a fluid in the patient and $\eta$ is a noise term;
    (b) computing a predetermined number of correlated segments of the cardiovascular system corresponding to two regions of interest thereof by computing a similarity metric of a time series of pixel values in the images of the series;

(c) computing one of the time-value curves for each of the two regions of interest; and (d) determining the protocol for the diagnostic imaging procedure based at least in part upon data extracted from the time value curves computed for the two regions of interest of the cardiovascular system of the patient.

2. The method of claim 1 wherein M=2 thereby rendering the M-dimensional data sets as two-dimensional data sets.

3. The method of claim 1 wherein M=3 thereby rendering the M-dimensional data sets as three-dimensional data sets.

4. The method of claim 1 wherein the predetermined number of correlated segments are computed using K-means clustering.

5. The method of claim 4 wherein K clusters are computed by minimizing a sum of squares of distances between data points and a K cluster centroid corresponding thereto, wherein K is an integer corresponding to the predetermined number of correlated segments.

6. The method of claim 5 wherein the pixel values are randomly assigned to the K clusters and each of the K cluster centroids is a component-wise mean of the pixel values in the K cluster corresponding thereto after centering and normalizing the pixel values to a zero mean and unit standard deviation as follows:

$$\hat{y}_x = \frac{y_x - \bar{y}_x}{\sigma_x}$$

wherein a mean $\bar{y}_x$ and a standard deviation $\sigma_x$ are calculated using the following formulas:

$$\bar{y}_x = \frac{1}{T}\sum_{i=1}^{T} y_x(i) \text{ and}$$

$$\sigma_x \sqrt{\frac{1}{T}\sum_{i=1}^{T}(y_x(i)-\bar{y}_x)^2}.$$

7. The method of claim 6 wherein each of the K cluster centroids is determined using the following formula:

$$y_c = \frac{1}{N}\sum_{x \in cluster} \hat{y}_x$$

wherein N is the number of pixels in the K cluster corresponding thereto.

8. The method of claim 7 wherein the distance from the centered and normalized pixel values to each of the K cluster centroids $y_c$ is determined using the formula:

$$dist(\hat{y}_x, y_c) = 1 - \frac{1}{T-1}\sum_{t=1}^{T} \hat{y}_x(i) \times y_c(i).$$

9. The method of claim 8 wherein each of the centered and normalized pixel values is assigned to the K cluster to which it exhibits the minimum computed distance to the K cluster centroid thereof.

10. The method of claim 9 wherein the actions of claims 7 through 9 are repeated until convergence, resulting in a segmented image having K segments corresponding to the determined K clusters.

11. The method of claim 10 further comprising filtering the segmented image to eliminate pixels that are not well correlated with neighboring pixels.

12. The method of claim 11 wherein each pixel of the segmented image is compared with all eight of its neighboring pixels in filtering.

13. The method of claim 11 further comprising morphologically opening the segmented image.

14. The method of claim 13 further comprising overlaying the segmented image upon a contrast enhanced bolus data set and computing enhancement profiles for each of the K segments.

15. The method of claim 14 further comprising semantically labeling at least one of the enhancement profiles with a semantic label corresponding to an appropriate one of the two regions of interest of the patient based upon at least one characteristic of the labeled enhancement profile as compared to at least one other computed enhancement profile.

16. The method of claim 10 further comprising overlaying the segmented image upon a contrast enhanced bolus data set and computing enhancement profiles for each of the K segments.

17. The method of claim 16 further comprising semantically labeling at least one of the enhancement profiles with a semantic label corresponding to an appropriate one of the two regions of interest of the patient based upon at least one characteristic of the labeled enhancement profile as compared to at least one other computed enhancement profile.

18. The method of claim 1 wherein a first of two regions of interest is a portion of a pulmonary artery of the patient and a second of the two regions of interest is a portion of an aorta of the patient.

19. The method of claim 1 wherein a first of two regions of interest is at least one of vessels and structure of a right side of a heart of the patient and a second of the two regions of interest is at least one of vessels and structure of a left side of the heart of the patient.

20. The method of claim 1 wherein the fluid includes a contrast medium.

21. The method of claim 1 wherein the method is embodied in software embodied in at least one of (i) the imaging system, (ii) an injector system and (iii) a system separate and standalone from the imaging system and the injector system.

22. A system for extracting time-value curves for use in determining a protocol for a diagnostic imaging procedure to be performed on a patient, the system comprising:

(a) an input system for input of data output from at least one imaging system, the data comprising a series of 0 through T M-dimensional data sets of pixel values from a series of images of a cardiovascular system of the patient acquired using the at least one imaging system, wherein M is an integer, T is an integer, the 0 data set corresponds to a data set at a time t=0, the T data set corresponds to a data set at a time t=T, and wherein a pixel at a location represented by a variable x has an enhancement profile vector defined as:

$$y_x=[y_x(0)y_x(1)\ldots y_x(T-1)y_x(T)]$$

and an enhancement level y of the pixel at the location x is defined over time as:

$$y_x(t)=y_x(0)+s_x(t)+\eta_x(0$$

wherein $y_x(0)$ is a baseline enhancement level for the pixel, s is a change in signal due to flow of a fluid in the patient and η is a noise term;
- (b) at least one processor in communicative connection with the input system and adapted to compute (i) a predetermined number of correlated segments of the cardiovascular system corresponding to two regions of interest thereof by computing a similarity metric of a time series of pixel values in the images of the series and (ii) one of the time value curves for each of the two regions of interest; and
- (c) at least one parameter generator system to determine the protocol for the diagnostic imaging procedure based at least in part upon data extracted from the time value curves computed for the two regions of interest of the cardiovascular system of the patient.

23. The system of claim 22 further comprising a memory system in communicative connection with the at least one processor, the memory system having stored therein an algorithm executable by the at least one processor to compute the predetermined number of correlated segments of the cardiovascular system corresponding to the two regions of interest of the patient.

24. The system of claim 22 wherein the system is in communicative connection with at least one of (i) the at least one imaging system (ii) at least one injector system.

25. The system of claim 22 wherein a first of two regions of interest is a portion of a pulmonary artery of the patient and a second of the two regions of interest is a portion of an aorta of the patient.

26. The system of claim 22 wherein a first of two regions of interest is at least one of vessels and structure of a right side of a heart of the patient and a second of the two regions of interest is at least one of vessels and structure of a left side of the heart of the patient.

27. The system of claim 22 wherein the fluid includes a contrast medium.

* * * * *

UNITED STATES PATENT AND TRADEMARK OFFICE
CERTIFICATE OF CORRECTION

PATENT NO. : 8,699,770 B2  Page 1 of 1
APPLICATION NO. : 13/655525
DATED : April 15, 2014
INVENTOR(S) : Kemper et al.

It is certified that error appears in the above-identified patent and that said Letters Patent is hereby corrected as shown below:

IN THE SPECIFICATION:
In Column 7, Line 43, delete "determined Time" and insert -- determined. Time --, therefor.
In Column 8, Line 13, delete "potion" and insert -- portion --, therefor.
In Column 9, Line 39, delete "520" and insert -- 520, --, therefor.
In Column 12, Line 29, delete "T1peak" and insert -- T1 --, therefor.

In Column 13, Line 62, in Equation (17), delete " $\Delta(T-T_{arr})$ " and insert -- $(T-T_{arr})$ --, therefor.
In Column 13, Line 62, delete Equation No. "(17)" and insert Equation No. -- (16) --, therefor.
In Column 14, line 2, delete Equation No. "(18)" and insert Equation No. -- (17) --, therefor.
In Column 14, line 12, delete Equation No. "(19)" and insert Equation No. -- (18) --, therefor.

IN THE CLAIMS:
In Column 14, Line 53, in Claim 1, delete "1=0," and insert -- t=0, --, therefor.
In Column 16, Line 67, in Claim 22, delete "ηx(0" and insert -- ηx(t) --, therefor.

Signed and Sealed this
Twenty-ninth Day of July, 2014

Michelle K. Lee
*Deputy Director of the United States Patent and Trademark Office*